(12) United States Patent
Temple

(10) Patent No.: US 7,934,894 B1
(45) Date of Patent: May 3, 2011

(54) REUSABLE PALLET WRAP

(76) Inventor: Kevin Temple, Anchorage, AK (US)

( * ) Notice: Subject to any disclaimer, the term of this patent is extended or adjusted under 35 U.S.C. 154(b) by 858 days.

(21) Appl. No.: 11/823,637

(22) Filed: Jun. 27, 2007

(51) Int. Cl.
*B60P 7/08* (2006.01)

(52) U.S. Cl. .............. 410/97; 410/34; 410/35; 410/99

(58) Field of Classification Search .............. 410/32, 410/34, 35, 46, 96, 97, 99, 118; 24/16 R, 24/442; 206/386, 597; 108/55.1; 53/399, 53/461
See application file for complete search history.

(56) References Cited

U.S. PATENT DOCUMENTS

| | | | |
|---|---|---|---|
| 3,185,197 A | 5/1965 | Spiro et al. | |
| 3,371,815 A | 3/1968 | Macomber | |
| 4,738,371 A | 4/1988 | Wakemen | |
| 4,868,955 A | 9/1989 | Magnant et al. | |
| 4,876,841 A | 10/1989 | Jensen | |
| 6,050,419 A | 4/2000 | Flanagan et al. | |
| 6,929,438 B1 * | 8/2005 | Foster et al. | 410/46 |

* cited by examiner

*Primary Examiner* — Stephen Gordon
(74) *Attorney, Agent, or Firm* — Michael J. Tavella

(57) ABSTRACT

A reusable pallet wrap for securing lading on pallets. The invention consists of an adjustable flexible wrap made from one rectangular shaped cloth (synthetic blend preferred) and has hook and loop fasteners sewn on the ends. The ends run from top to bottom of the wrap. Squares of hook and loop fastener are secured to the bottom of the wrap that line up with each corner of the pallet. Sewn into these squares are straps that are passed under the pallet to connect the wrap to the pallet. Once this is done, the load is secured to the pallet. Two straps with hook and loop fastener ends are also sewn directly to the wrap that give an added stability to load as well as to secure the wrap. Finally, a top cover can be added if load requires protection from the elements.

13 Claims, 9 Drawing Sheets

REUSABLE PALLET WRAP

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to reusable pallet wraps.

2. Description of the Prior Art

For the past several decades, the common practice for preparing loads for shipment has been to use a shrink-wrap film that wraps around a pallet that has a load placed on it. This can be done either by machine or by hand to secure loads to pallets. Problems with this method of are as follows. First, the process is both time and labor intensive. Not only must the wrap be applied, but it must also be removed at the destination. Shrink-wrap is sticky by nature and pallets that are loaded closely in containers often times stick together making it hard to remove from the containers when it reaches its destination.

Shrink-wrap is recyclable but most companies do not take the time and added expense to recycle the shrink-wrap; rather, it is normally cut from pallet and thrown away. Finally, while shrink-wrap secures the load, it is not actually attached to the pallet so loads may shift off the pallet during shipping.

BRIEF DESCRIPTION OF THE INVENTION

The instant invention overcomes these problems. It is a reusable pallet wrap for securing lading on pallets. The invention consists of an adjustable flexible wrap made from a tarp like material. The wrap can be made from various materials to fit a customer's needs, such as being waterproof or fire retardant. The wrap is able to contain loads of up to 2000 lbs and be puncture resistant. Of course, heavier versions can be made for loads over 2000 lbs.

The reusable wrap saves time and labor on both sides of shipping and receiving. It will not stick to itself. It can be used many times over and is, therefore, be a more environmentally friendly way to ship. Moreover, repeatedly using the wrap decrees the cost incurred in shipping.

Finally, it is attached to the pallet thus ensuring loads will no longer be able to shift off a pallet.

The reusable pallet wrap is preferably to fit on a normal pallet size of 40×48 inches. This size is the standard size for most pallets-both the wooden as well as the stackable plastic type. The wrap has a preferred height of 6 feet, 6 inches, which is sufficient for most customers' needs.

The wrap is made from one rectangular shaped cloth (synthetic blend preferred) and has hook and loop fasteners sewn on the ends. The ends run from top to bottom of the ends of the wrap. In one embodiment, there are eight squares of hook and loop fastener that line up parallel to each corner of the pallet. Sewn into these squares are straps that are passed under the corner of the pallet and then up on the other side of the pallet so that it terminates on the wrap. Once these corners are connected, the load is secured to the pallet.

There are also two long straps with hook and loop fastener ends. One is positioned about one quarter of the way up from the bottom of the wrap and the second is one quarter of the way down from the top from the top of the wrap. They are sewn directly to the wrap and positioned in opposite facing directions. These straps may consist of a elastic type of material to give an extra snug fit around the lading. In most cases though, the straps are rigid high strength straps. These straps give an added stability to load as well as to secure the wrap. However, the straps do not have to be used in order for the wrap to work.

An additional strap can be added by sewing a band of hook and loop fastener around the length of the top of the wrap.

Finally, a top cover can be added if load requires protection from the elements.

DETAILED DESCRIPTION OF THE INVENTION

Figure 1:
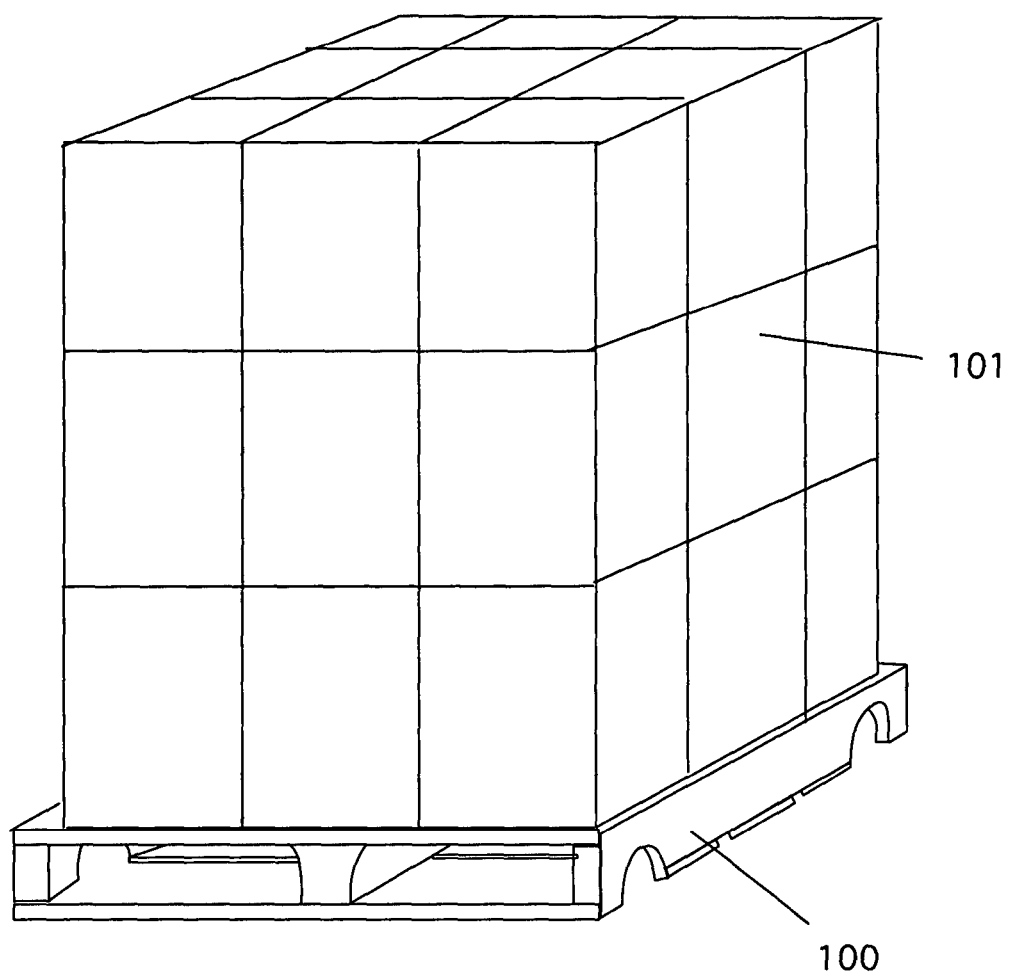
FIG. 1 is a perspective view of a pallet loaded with boxes.

Referring now to FIG. 1, a pallet 100 loaded with boxes 101 is shown. This is a typical method of shipping bulk items. As noted above, it has a problem in that the boxes are not secured to the pallet.

Figure 2:
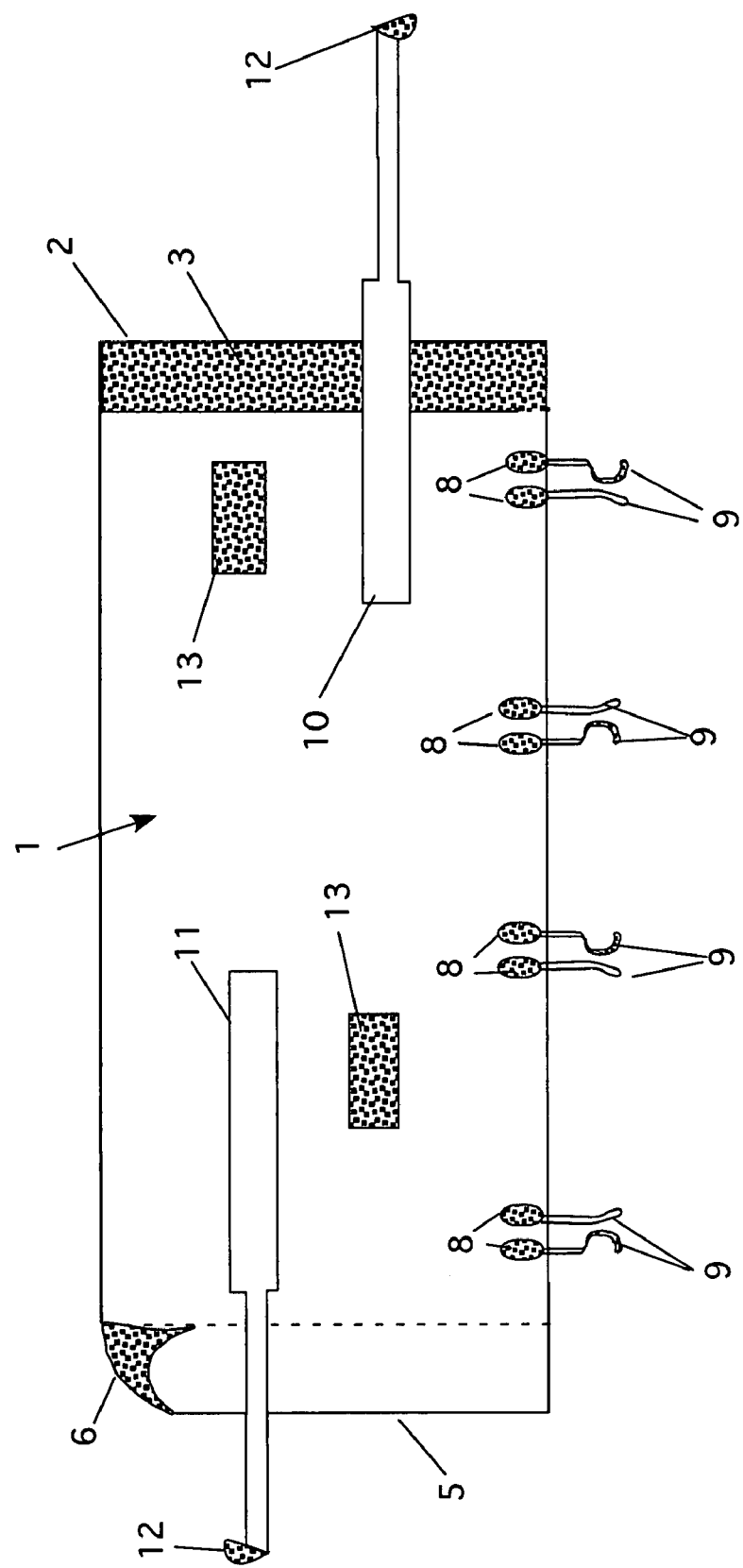
FIG. 2 is a front view of the first embodiment of the invention shown laid out flat.

FIG. 2 is a front view of the first embodiment of the invention shown laid out flat. The invention 1 is a generally rectangular sheet of material that is sized to fit around a full pallet. Typically, a pallet is 40 inches by 48 inches, so the overall preferred length is approximately 185 inches long (to allow for sufficient overlap of the ends). The wrap 1 is made of a synthetic blend of materials, suitable for such use.

The wrap 1 has hook and loop type fasteners attached as shown. One end of the wrap 2 has a hook and loop 3 that runs the full height of the wrap on the front. The other end 5 of the wrap has a corresponding length of hook and loop fastener 6 that is attached to the back of the wrap.

Figure 4:
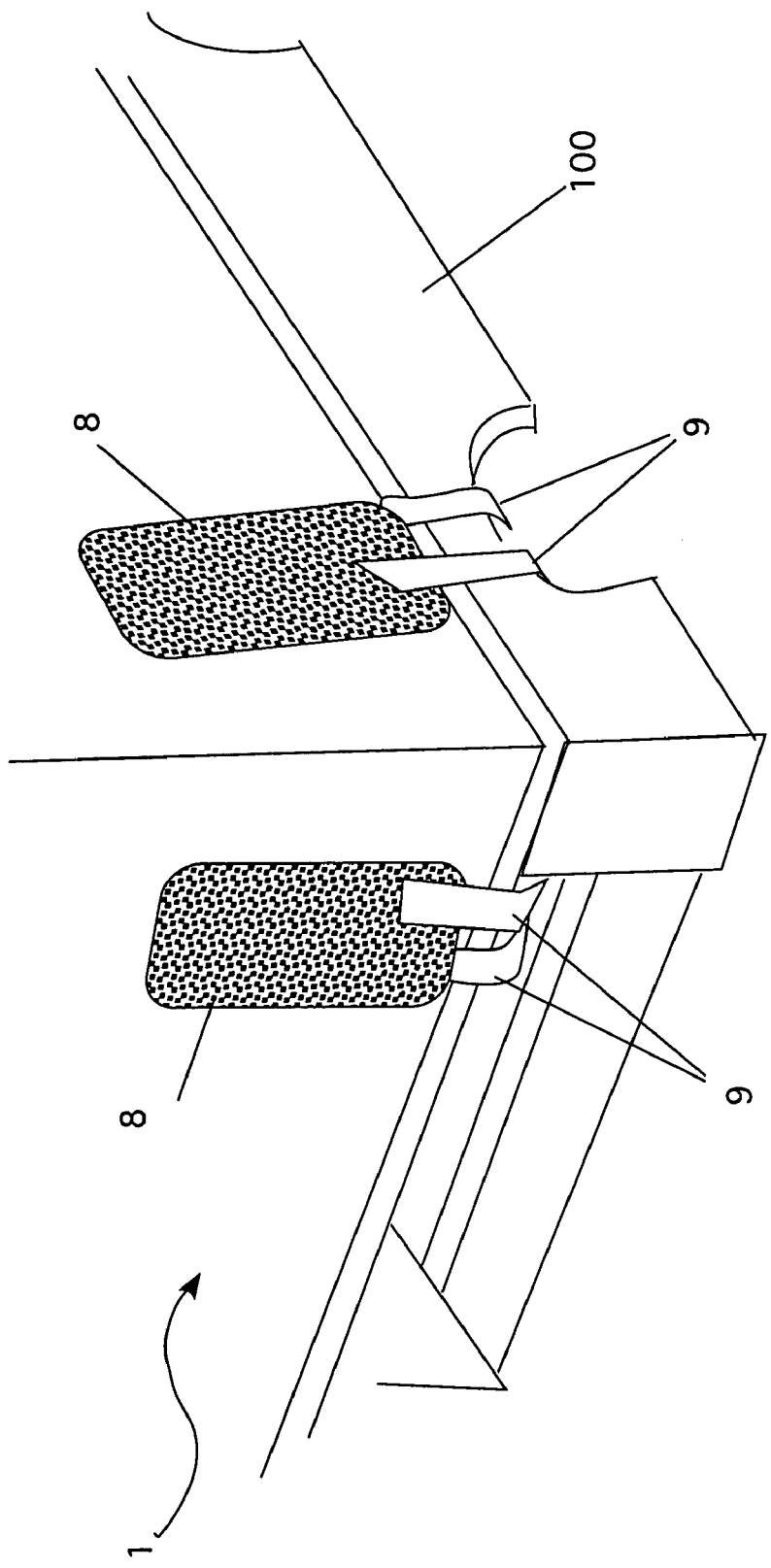
FIG. 4 is a detail view of one of the corner ties of the device, in place on a pallet.

The base 7 of the wrap has four pairs of blocks 8 of hook and loop attached to the front of the wrap as shown. A strap 9 is attached to each of the blocks 8 as shown. These blocks and straps are used to secure the wrap to a pallet as shown in FIG. 4. Note that the backs of the straps 9 have corresponding hook and loop attached, as shown.

Two other long straps are also sewn to the front of the wrap. The lower strap 10 and upper strap 11 extend past the ends of the wrap as shown. Note that the back 12 of these straps is fitted with hook and loop as well.

Two blocks 13 of hook and loop are secured to the front surface of the wrap. They are used to secure the straps 10 and 11 as shown in FIG. 3.

Figure 3:
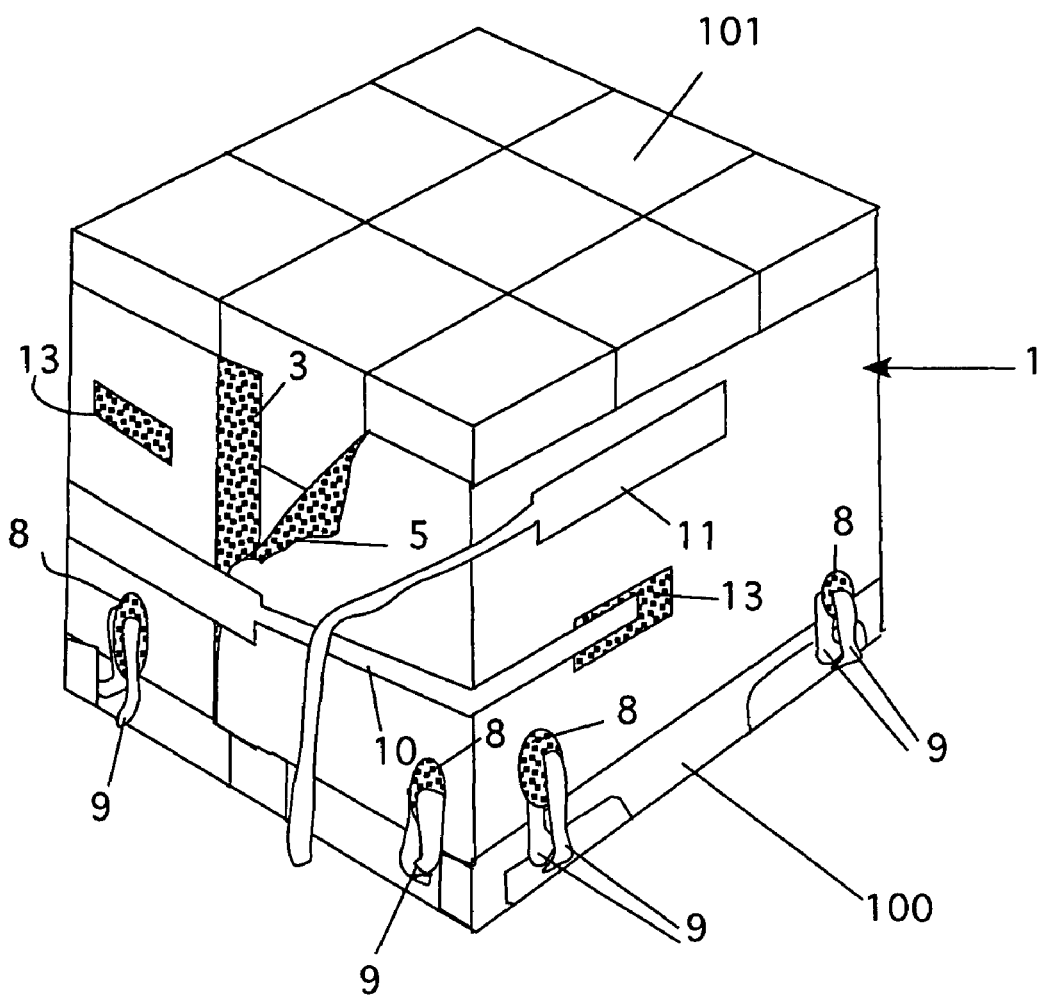
FIG. 3 is a perspective view of the pallet of FIG. 1 showing the invention in place.

FIG. 3 is a perspective view of the pallet of FIG. 1 showing the invention in place. Here, the invention 1 is wrapped around the boxes. Unlike shrink-wrap, this wrap is reusable.

It fits around the load and conforms to its shape. The two ends 3 and 5 are brought together and are used to seal the wrap. Then, the straps 10 and 11 are pulled around the load and attached to the hook and loop blocks 13 (note only strap 10 is attached. The end of strap 11 is left hanging until the face of the wrap is fully closed.). Finally, the corner straps 9 are wrapped around the pallet corners are attached to the hook and loop blocks 8 (see FIG. 3). Once this is done, the load is ready for shipment. Once the load arrives at its destination, the straps are loosened, and the wrap is removed quickly and easily.

FIG. 4 is a detail view of one of the corner ties of the device, in place on a pallet. Here, the block 8 of hook and loop is shown placed around a corner of the load The straps 9 are shown passing through the corner of the pallet 100, where they are secured to the hook and loop block. In the preferred embodiment, two straps 9 are used per corner to securely hold the load to the pallet.

Figure 5:
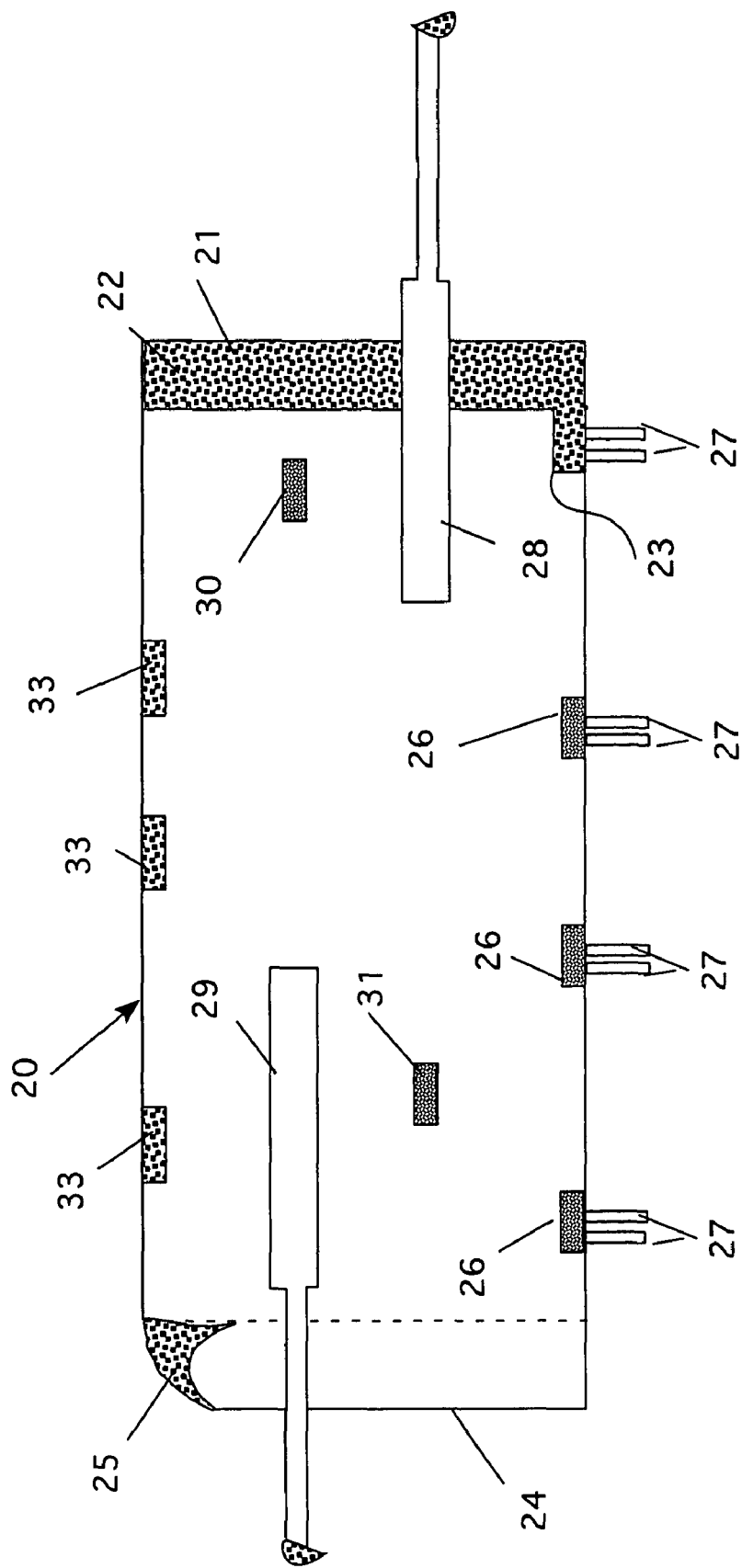
FIG. 5 is a front view of a second embodiment of the invention.

FIG. 5 is a front view of a second embodiment of the invention. Here, the wrap 20 has hook and loop type fasteners attached as shown. One end of the wrap 21 has a hook and loop 22 that runs the full height of the wrap on the front and extends to the side at the base forming an "L" portion 23. The other end 24 of the wrap has a corresponding length of hook and loop fastener 25 that is attached to the back of the wrap. Three blocks 26 are placed on the bottom of the wrap as shown. As before, these blocks are used to secure the wrap to the pallet with straps 27. Unlike the first embodiment, the blocks 26 are one piece and are fit around the corners (see FIG. 6). Note that the fourth block is the "L" shaped portion 23 at the base of the end 21. Like the first embodiment, this wrap has two straps 28 and 29. Strap 29 is secured by pad 30. Strap 28 is secured by pad 31. Note also the patches 33 near the top of the wrap. These are optional and are used with a cover 32 as shown in FIG. 7.

Figure 6:
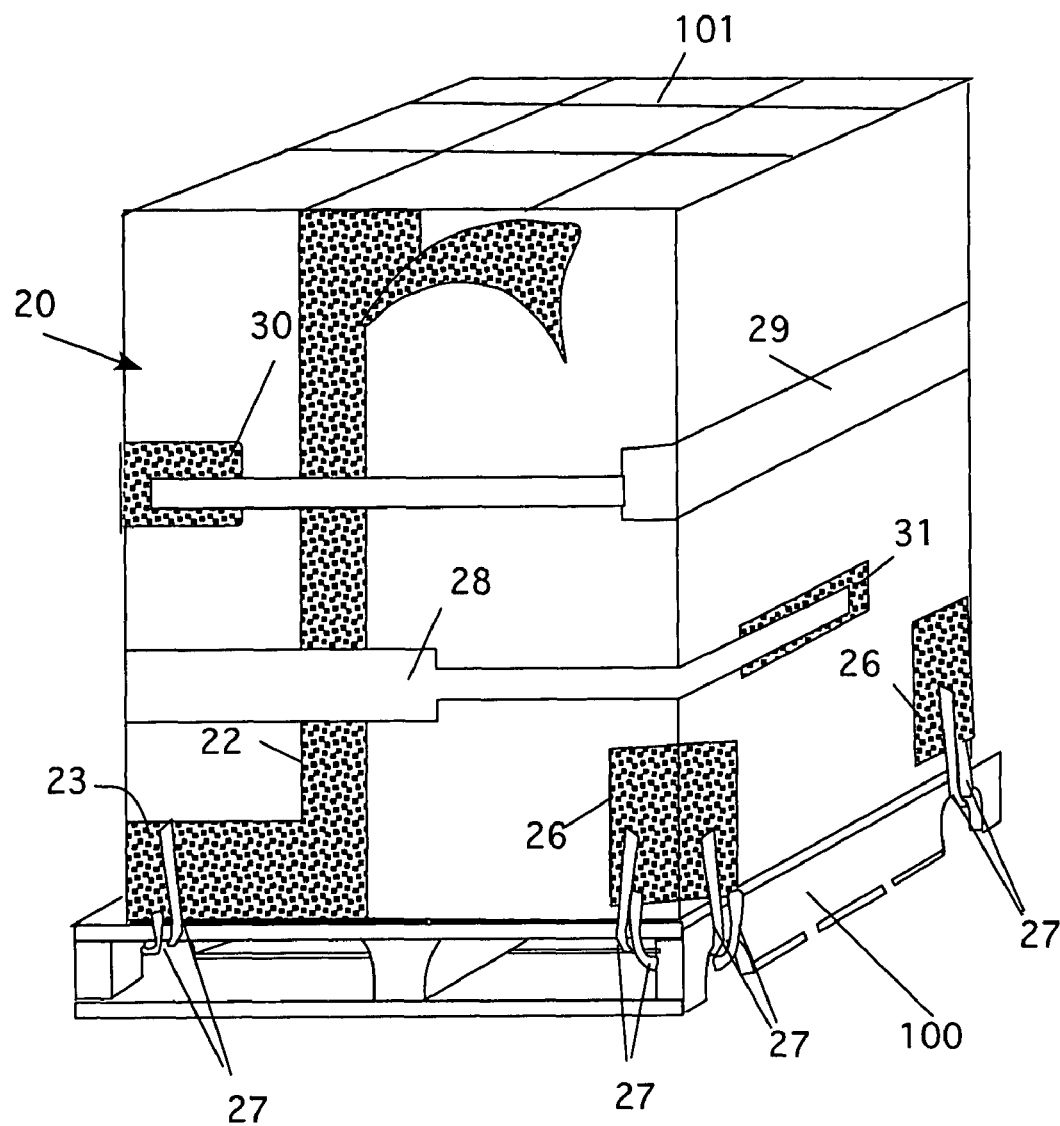
FIG. 6 is a perspective view of the second embodiment in place on a pallet.

FIG. 6 is a perspective view of the second embodiment in place on a pallet. Note how the straps 28 and 29 attach to the wrap and how the solid corner blocks 26 fit around the corners.

Figure 7:
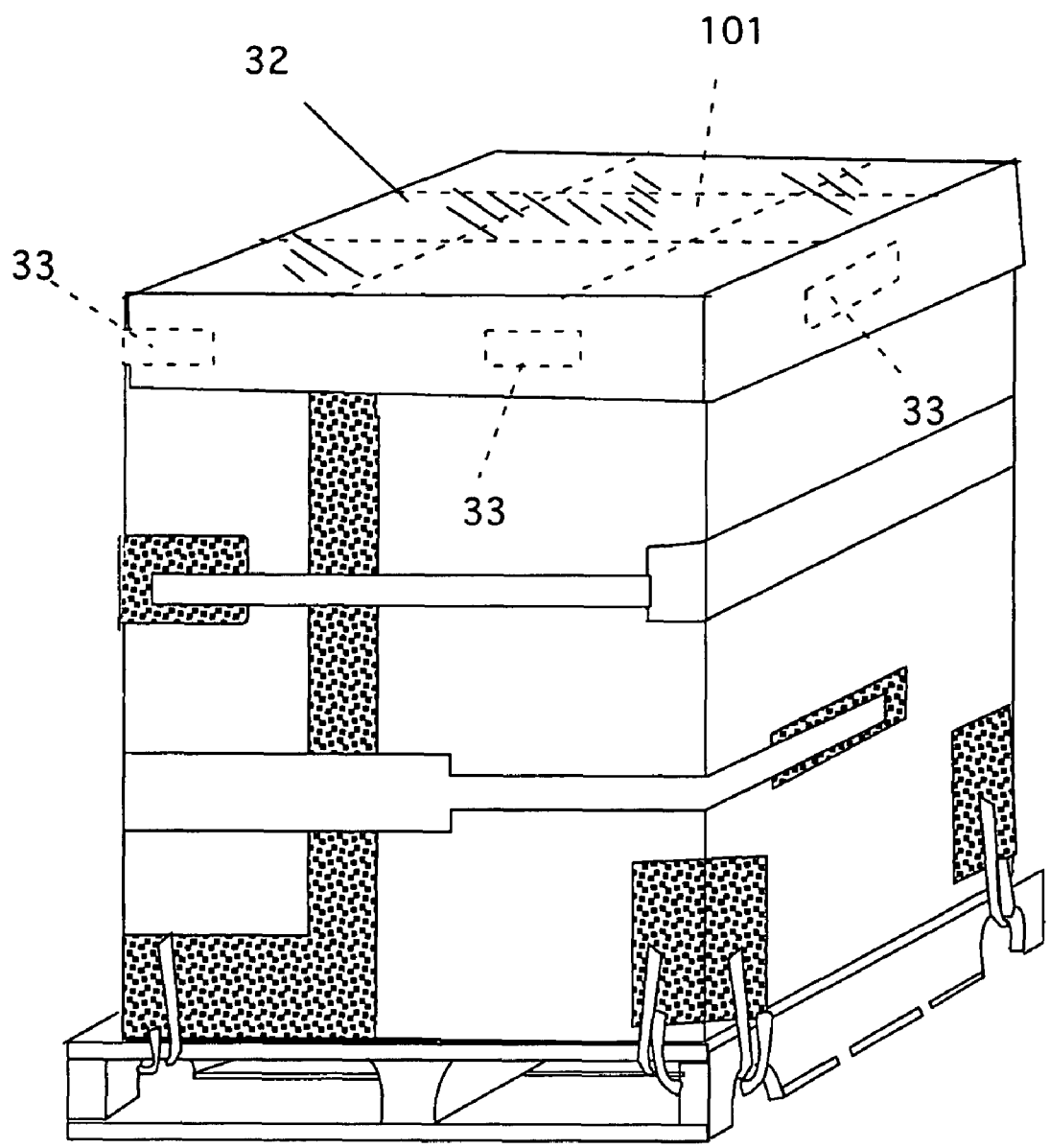
FIG. 7 is a perspective view of the invention showing a top cover in place on the pallet.

FIG. 7 is a perspective view of the invention showing a top cover in place on the pallet. Here, the second embodiment of the wrap is shown with a cover 32. The cover is secured to the wrap by hook and loop sections 33.

Figure 8:
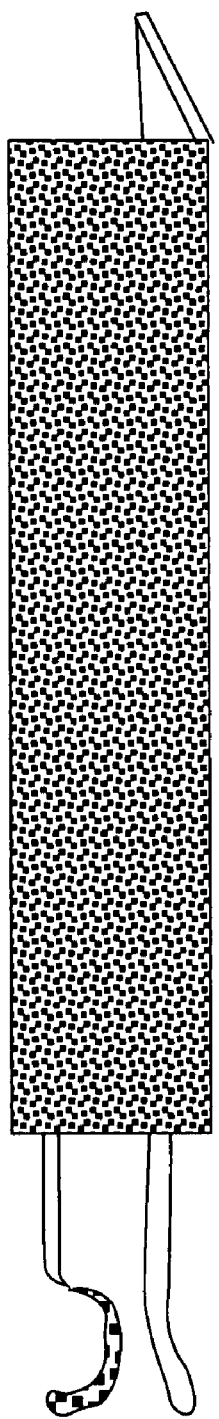
FIG. 8 is a perspective view of an optional corner brace.

FIG. 8 is a perspective view of an optional corner brace. Here, the corner brace 40 has an angled form as shown. The outside of the brace can be covered with the hook portion of a hook and loop type fastener 41 as an option. Two straps 42 are attached to the bottom of the corner brace. These straps are used to secure the brace to the pallet, in the same manner that the wrap is secured. The corners are used to provide additional bracing, especially for light loads, where high strength is not needed. In its preferred form, only two braces, placed on opposite corners are used. However, there is no reason why four corner braces could not be used. This provides the greatest benefit while keeping the time it takes to wrap a load to a minimum.

Figure 9:
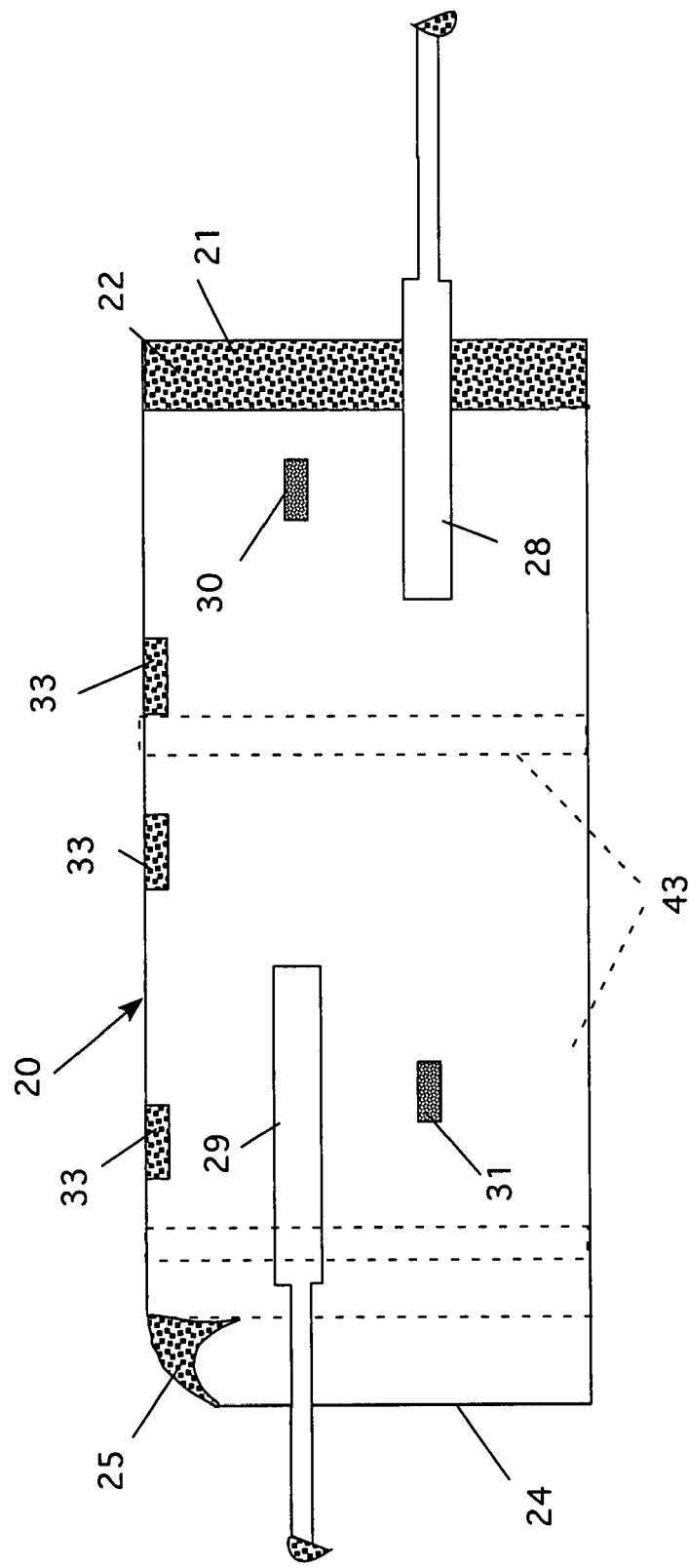
FIG. 9 is a front view of a modified wrap for use with the optional corner brace of FIG. 8.

When the corner braces 40 are used, the wrap can be secured to them by the optional hook and loop covering 41. This requires a modified wrap. FIG. 9 is a front view of a modified wrap for use with the optional corner brace of FIG. 8. Here, the bottom straps are removed, as they are not needed. Two strips of hook and loop type fastener 43 are placed on the back of the wrap as shown in the dashed lines. These strips are positioned to coordinate with the corner braces so that as the wrap is installed, the wrap is secured to the braces. The wrap is still closed in the front with strips 21 and 25 as well as being secured with the straps 28 and 29, as discussed above. In this way, lightly loaded pallets can be secured quickly and easily for shipment.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A reusable wrap for securing a load to a pallet having four corners comprising:
   a) a generally rectangular piece of flexible material having a front, a back, top, bottom, a length, a first end and a second end;
   b) a section of hook and loop type fastener, fixedly attached to the front of the first end of said generally rectangular piece of flexible material;
   c) a section of corresponding hook and loop type fastener, fixedly attached to back of the second end of said generally rectangular piece of flexible material;
   d) a strap having a first end, and a second end having a front and a back, whereby the first end of said strap is fixedly attached to the front of said generally rectangular piece of flexible material,
   e) a means for securing the second end of the strap to said generally rectangular piece of flexible material; and
   f) a means for securing said reusable wrap to said pallet.

2. The reusable wrap of claim 1 wherein the strap has a length sufficient to traverse a length said generally rectangular piece of flexible material from a point where the strap first end is fixedly attached to the generally rectangular piece of flexible material to a point adjacent to, but offset from, the point where the first end is fixedly attached to the generally rectangular piece of flexible material.

3. The reusable wrap of claim 1 wherein the means for securing the second end of the strap comprises:
   a) at least one block of hook and loop material fixedly attached to the front of said generally rectangular piece of flexible material at a spaced apart distance from the first and second end of said generally rectangular piece of flexible material; and
   b) a corresponding length of hook and loop type fastener secured to the back of the second end of said strap.

4. The reusable wrap of claim 1 wherein the means for securing the reusable wrap to said pallet comprise:
   a) at least one block of hook and loop type fastener, fixedly attached to the bottom of the generally rectangular piece of flexible material, and
   e) at least one strap of hook and loop material, having a first end and a second end, whereby the first end of the strap of hook and loop material is fixedly attached to the at least one block of hook and loop type fastener, fixedly attached to the bottom of the generally rectangular piece of flexible material such that the at least one strap hangs downwardly therefrom.

5. The reusable wrap of claim 1 wherein the means for securing the reusable wrap to said pallet comprise:
   a) at least one block of hook and loop type fastener, fixedly attached to the bottom of the generally rectangular piece of flexible material, such that when said generally rectangular piece of flexible material is positioned around a load on the pallet, the least one block of hook and loop type fastener, fixedly attached to the bottom of the generally rectangular piece of flexible material is aligned with a corner of the pallet; and e) at least one strap of hook and loop material, having a first end and a second end, whereby the first end of the strap of hook and loop material is fixedly attached to a side of the least one block of hook and loop type fastener, fixedly attached to the bottom of the generally rectangular piece of flexible material such that the at least one strap hangs downwardly therefrom, and further wherein said strap of hook and loop material is removably attachable to another side of the at least one block of hook and loop type fastener fixedly attached to the bottom of the generally rectangular piece of flexible material such that when said generally rectangular piece of flexible material is positioned around a load on the pallet, said strap of hook and loop material is passed through said pallet and removably attached to the another side of the at least one block of hook and loop type fastener so that the generally rectangular piece of flexible material is temporarily secured to said pallet.

6. The reusable wrap of claim 1 wherein the means for securing the reusable wrap to said pallet comprise:
   a) a plurality of blocks of hook and loop type fastener, fixedly attached to the bottom of the generally rectangular piece of flexible material, and being positioned such that when said generally rectangular piece of flexible material is positioned around a load on the pallet, each of said plurality of blocks of hook and loop type fastener, fixedly attached to the bottom of the generally rectangular piece of flexible material is aligned with one of four corners of the pallet; and
   e) at least one strap of hook and loop material, having a first end and a second end, whereby the first end of the at least one strap is fixedly attached to a side of each of said plurality of blocks of hook and loop type fastener, fixedly attached to the bottom of the generally rectangular piece of flexible material such that the at least one strap hangs downwardly therefrom and further wherein said at least one strap is removably attached to another side of each of said plurality of blocks of hook and loop type fastener, fixedly attached to the bottom of the generally rectangular piece of flexible material such that the at least one strap passes under one of the four corners of the pallet when said generally rectangular piece of flexible material is positioned around a load on the pallet.

7. The reusable wrap of claim 1 further comprising a top cover, removably attached to said generally rectangular piece of flexible material after said generally rectangular piece of flexible material is positioned on a pallet.

8. The reusable wrap of claim 7 further comprising a means for temporarily securing the top cover in place on said generally rectangular piece of flexible material.

9. The reusable wrap of claim 8 wherein the means for temporarily securing the top cover in place includes at least one length of hook and loop type fastener.

10. The reusable wrap of claim 1 wherein the means for securing the reusable wrap to said pallet comprise:
   a) a plurality of blocks of hook and loop type fastener, fixedly attached to the bottom of the generally rectangular piece of flexible material, and being positioned such that when said generally rectangular piece of flexible material is positioned around a load on the pallet, each of said plurality of blocks of hook and loop type fastener, fixedly attached to the bottom of the generally rectangular piece of flexible material is aligned with one of four corners of the pallet; and
   e) a pair of straps of hook and loop material, each of said pair of straps having a first end and a second end, whereby the first end of each of the pair of straps is fixedly attached to a side of each of said plurality of blocks of hook and loop type fastener fixedly attached to the bottom of the generally rectangular piece of flexible material such that each of said pair of straps hangs downwardly therefrom, and further wherein each of said pair of straps is removably attached to another side of each of said plurality of blocks of hook and loop type fastener fixedly attached to the bottom of the generally rectangular piece of flexible material such that each of said pair of straps passes under one of the four corners of the pallet when said generally rectangular piece of flexible material is positioned around a load on the pallet.

11. A reusable wrap for securing a load to a pallet comprising:
   a) a generally rectangular piece of flexible material having a front, a back, top, bottom, a first end and a second end;
   b) a section of hook and loop type fastener, fixedly attached to a front of the first end of said generally rectangular piece of flexible material;
   c) a section of corresponding hook and loop type fastener, fixedly attached to back of the second end of said generally rectangular piece of flexible material;
   d) at least one block of hook and loop material fixedly attached to the front of said generally rectangular piece of flexible material and a spaced apart distance from the first and second end of said generally rectangular piece of flexible material;
   c) a strap having a first end and a second end, whereby the first end of said strap is fixedly attached to the front of said generally rectangular piece of flexible material, and further wherein the second end of the strap has a back and further wherein the back of the second end of the strap has a length of hook and loop type fastener secured thereto, and further wherein said strap has a length sufficient to traverse the front of said generally rectangular piece of flexible material from a point where the strap first end is fixedly attached to the block of hook and loop type fastener;
   d) at least one block of hook and loop type fastener, fixedly attached to the bottom of the generally rectangular piece of flexible material, such that when said generally rectangular piece of flexible material is positioned around a load on the pallet, the least one block of hook and loop type fastener fixedly attached to the bottom of the generally rectangular piece of flexible material is aligned with a corner of the pallet; and
   e) at least one strap of hook and loop material, having a first end and a second end, whereby the first end of the strap of hook and loop material is fixedly attached to a side of the least one block of hook and loop type fastener fixedly attached to the bottom of the generally rectangular piece of flexible material such that the at least one strap hangs downwardly therefrom and further wherein said strap of hook and loop material is removably attached to another side of the at least one block of hook and loop type fastener, fixedly attached to the bottom of the generally rectangular piece of flexible material such that the strap of hook and loop material passes under a corner of the pallet when said generally rectangular piece of flexible material is positioned around a load on the pallet.

12. The reusable wrap for securing a load to a pallet of claim 11 further comprising a second strap of hook and loop material, having a first end and a second end, whereby the first end of the second strap is fixedly attached to a side of the least one block of hook and loop type fastener fixedly attached to the bottom of the generally rectangular piece of flexible material such that the at least one strap hangs downwardly therefrom, and further wherein said second strap is removably attached to another side of the at least one block of hook and loop type fastener fixedly attached to the bottom of the generally rectangular piece of flexible material such that the second strap passes under the corner of the pallet when said generally rectangular piece of flexible material is positioned around a load on the pallet.

13. The reusable wrap for securing a load to a pallet of claim 11 further comprising a plurality of blocks of hook and loop type fastener, including said at least one block of hook and loop type fastener, fixedly attached to the bottom of the generally rectangular piece of flexible material, such that when said generally rectangular piece of flexible material is positioned around a load on a pallet, each of the plurality of blocks of hook and loop type fastener fixedly attached to the bottom of the generally rectangular piece of flexible material is aligned with a corner of the pallet when said generally rectangular piece of flexible material is positioned around a load on the pallet.

* * * * *